United States Patent
Szarvas et al.

(10) Patent No.: US 12,025,331 B2
(45) Date of Patent: Jul. 2, 2024

(54) METHOD AND SYSTEM FOR CONTROLLING THE TEMPERATURE OF A ROOM

(71) Applicant: Chameleon Smart Home Zrt., Budapest (HU)

(72) Inventors: Péter Szarvas, Budapest (HU); Szabolcs Mike, Budapest (HU)

(73) Assignee: CHAMELEON SMART HOME NYRT., Budapest (HU)

( * ) Notice: Subject to any disclaimer, the term of this patent is extended or adjusted under 35 U.S.C. 154(b) by 363 days.

(21) Appl. No.: 17/625,648

(22) PCT Filed: Jul. 13, 2020

(86) PCT No.: PCT/HU2020/050030
§ 371 (c)(1),
(2) Date: Jan. 7, 2022

(87) PCT Pub. No.: WO2021/009527
PCT Pub. Date: Jan. 21, 2021

(65) Prior Publication Data
US 2022/0316738 A1    Oct. 6, 2022

(30) Foreign Application Priority Data
Jul. 12, 2019   (HU) .................................. P1900250

(51) Int. Cl.
*F24F 11/63*    (2018.01)
*F24F 11/58*    (2018.01)
*G05B 19/042*   (2006.01)

(52) U.S. Cl.
CPC .............. *F24F 11/63* (2018.01); *F24F 11/58* (2018.01); *G05B 19/042* (2013.01); *G05B 2219/2614* (2013.01)

(58) Field of Classification Search
CPC . F24F 11/63; F24F 11/58; F24F 11/62; G05B 19/042; G05B 2219/2614; G05B 13/0265; G05D 23/1917
See application file for complete search history.

(56) References Cited

FOREIGN PATENT DOCUMENTS

DE    0935181 A2 *  8/1999  ......... G05B 13/0265

OTHER PUBLICATIONS

English Machine Translation "EP 0935181 A2" (Year: 1999).*

\* cited by examiner

*Primary Examiner* — Charles R Kasenge
(74) *Attorney, Agent, or Firm* — Olson & Cepuritis, Ltd.

(57) ABSTRACT

The present invention relates to a method for controlling the temperature of a room (20) provided with a temperature control device (10), in particular for keeping the temperature of the room (20) within a comfort temperature range defined by a lower and an upper hysteresis temperature (TL, TH), characterized in that—measuring the temperature change of a room (20) and generating first and second temperature time series (01, 02) from the measured temperature data, then using a neural network and using the first and second temperature time series (01, 02), we create predicted first and second temperature time series (P1, P2) indicating the future change of time series (01, 02), —determining predicted saturation temperature values ($T_{sat(P)}$) for the elements of the predicted first and second temperature time series (P1, P2), as switch-on and switch-off times ($t_{be}$, $t_{ki}$), using the neural network and the first and second temperature time series (01, 02), —selecting from the determined predicted saturation temperature values (Tsat(P)) the closest to the corresponding hysteresis temperature (TH, TL), based on which we determine switch-on and switch-off times ($t_{be}$, $t_{ki}$). The invention further relates to a system (100) for carrying out such a method.

9 Claims, 4 Drawing Sheets

METHOD AND SYSTEM FOR CONTROLLING THE TEMPERATURE OF A ROOM

CROSS-REFERENCE TO RELATED APPLICATION

Figure 1:
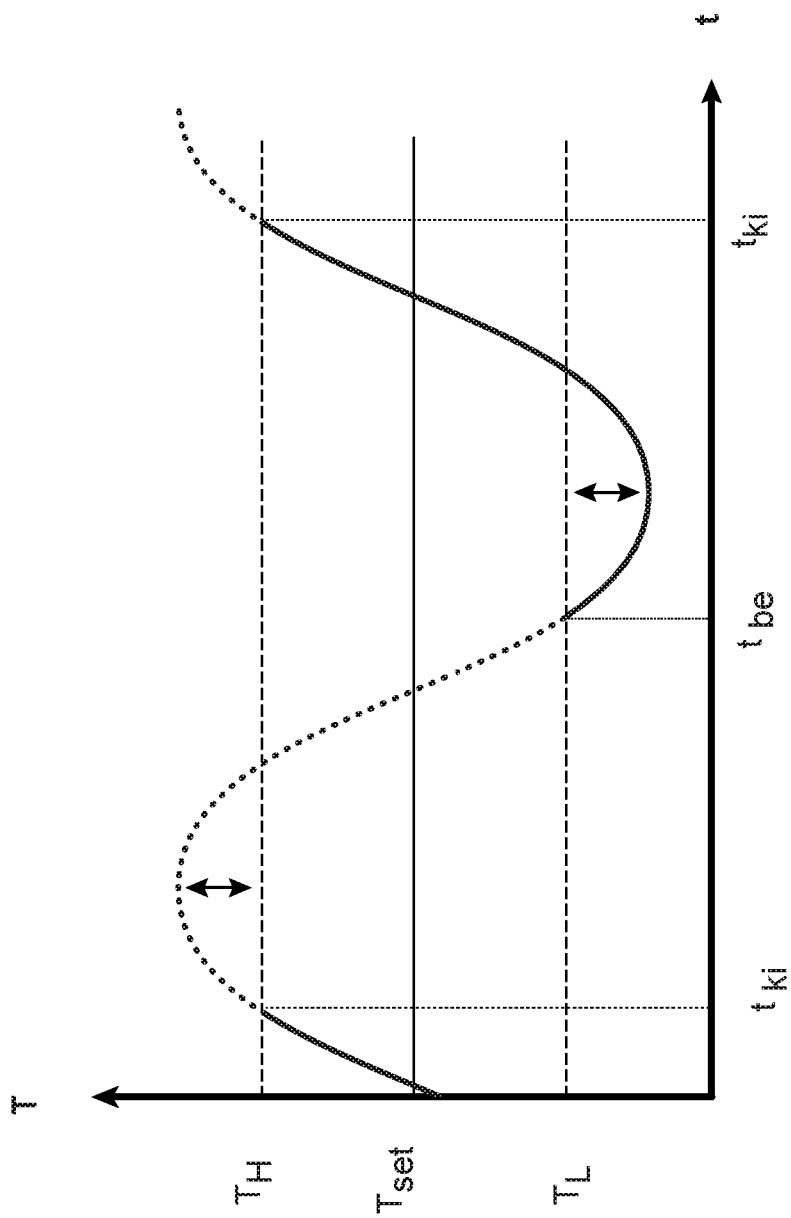

This application is a U.S. National Stage of PCT/HU2020/050030, filed Jul. 13, 2020, which claims priority to Hungarian Application No. P1900250, filed Jul. 12, 2019, each of which is incorporated herein by reference.

The present invention relates to a method for controlling the temperature of a room provided with a temperature control device, in particular for keeping the temperature of the room within a comfort temperature range defined by a lower and an upper hysteresis temperature.

The invention further relates to a system for carrying out the above method.

The basic function of the premises of buildings (e.g. rooms of residential buildings, interiors of factory halls, etc.) is to ensure adequate comfort of the occupants, which is significantly influenced by the internal temperature of the room. Cooling or heating systems are used to maintain the correct temperature.

The most commonly used surface cooling, heating (HVAC—Heating, ventilation, Air Conditioning) systems in buildings have high inertia. At the same time, it can be said that the temperature range within which an average person feels comfortable is quite narrow (only a few degrees Celsius). It is therefore essential to create a control that keeps the room temperature in this "comfort zone". In addition, with proper control, not only the comfort level but also the energy efficiency of the building can be improved.

The purpose of the thermostat in the room is to keep the temperature around a pre-set value with the lowest possible energy consumption and the most minimal control intervention (switching). This is a complex, non-linear control problem in which the thermodynamic characteristics of the controlled room as well as a number of transient processes also play a role. Examples of such thermodynamic characteristics are the sizing and design of the room, the material quality of the walls or the thermal conductivity of the doors and windows. Transient processes include, for example, changes in outdoor temperature on a seasonal or shorter time scale, or effects from the activities of room users (e.g. ventilation).

There have been a number of solutions to the above control problem in recent decades. Of these, perhaps the most common solution is the so-called PID (Proportional-Integral-Derivative) is a three-parameter control model, which is a type of controller based on parallel compensation, mainly used in the control of linear systems. The name PID refers to the principle of the controller, because the execution signal issued by the controller consists of members proportional to the error signal (P—proportional), the integral of the error signal (I—integral) and the derivative of the error signal (D—derivative), so the execution signal is the function of the current error, the past errors and the expected errors. If not all of the above members are used, they speak of P, PI, or PD regulation. The PID model is easy to implement, but due to the inertia of the heating/cooling medium and the non-linear nature of thermodynamic systems, this method is far from optimal for controlling thermostats. After switching the radiator on or off ($t_{ki}$, $t_{be}$), the room temperature exceeds the hysteresis temperatures $T_L$, $T_H$ due to thermal inertia (see FIG. 1). The main disadvantage of the PID model is that the fluctuation of the internal temperature of the room, i.e. the maximum allowable fluctuation around the desired temperature value, is large, which negatively affects the comfort level and the energy efficiency.

In the last decade or two, experiments have been started with neural network-based, self-learning thermostat control systems that try to find a connection between different thermodynamic parameters of a room—without actual knowledge of specific thermal processes. Such an experimental control based on a neural network is presented by Jin-Young Lee et al. "Predictive control of the Radiant Floor Heating System in Apartment Buildings", in which the boiler is switched on or off so that the room temperature rises or falls just to saturation temperatures (i.e. the permissible extremes around the set temperature). As an input parameter of the model, the indoor temperature and its change and the outdoor temperature and its change are measured, and as an output parameter, the model gives the current saturation temperature (maximum or minimum) if the radiator is switched on or off at the given moment. With the help of the described solution, the fluctuation around the set temperature and the number of on and off cycles can be minimized compared to the traditional controls, but the model must be evaluated at all times in order to calculate the saturation temperature and to determine the time when the radiator must be switched on or off.

We recognized that running neural network-based models is a resource-intensive task, so in practice—for economic reasons alone—, model calculations should be performed not on site, but on a dedicated infrastructure (e.g. on a remote server).

We recognized that if the neural network-based model is run away from the room (i.e., the control signal comes from the server side), interference in the communication channel between the remote server and the local control device (e.g., thermostat) in the room (e.g., network outages, noises, etc.) can adversely affect the control process.

We recognized that if saturation temperatures are not calculated for the current time instant, but are predetermined from a temperature time series predicted by a neural network model, the above problems can be effectively eliminated and a more robust and fault tolerant solution can be created.

We have also recognized that it is sufficient to measure only the change in the indoor temperature of the room to determine the saturation temperature, since the temperature time series thus obtained includes all other factors (e.g. the effect of the change in the outdoor temperature, etc.) through the thermodynamic equations.

It is an object of the present invention to provide a temperature control method and system which is free from the disadvantages of the prior art solutions, i.e. which is less sensitive to errors in the communication channel, thus enabling more reliable and robust temperature control.

The invention is based on the recognition that the saturation temperature values predicted by the neural network can be determined not only from the currently measured temperature data, but also from the elements—as initial values—of a predicted temperature time series produced by a neural network. That is, the neural network model does not need to be evaluated at all time points to determine the saturation temperature. In this way, in addition to saving computing capacity with the method according to the invention, the temperature control will also be more robust and insensitive to communication channel errors.

According to the invention, this object is achieved by a method for controlling the internal temperature of a room according to claim 1.

The object of the invention is further achieved by a system according to claim 5.

Preferred embodiments of the invention are defined in the dependent claims.

Figure 3A:
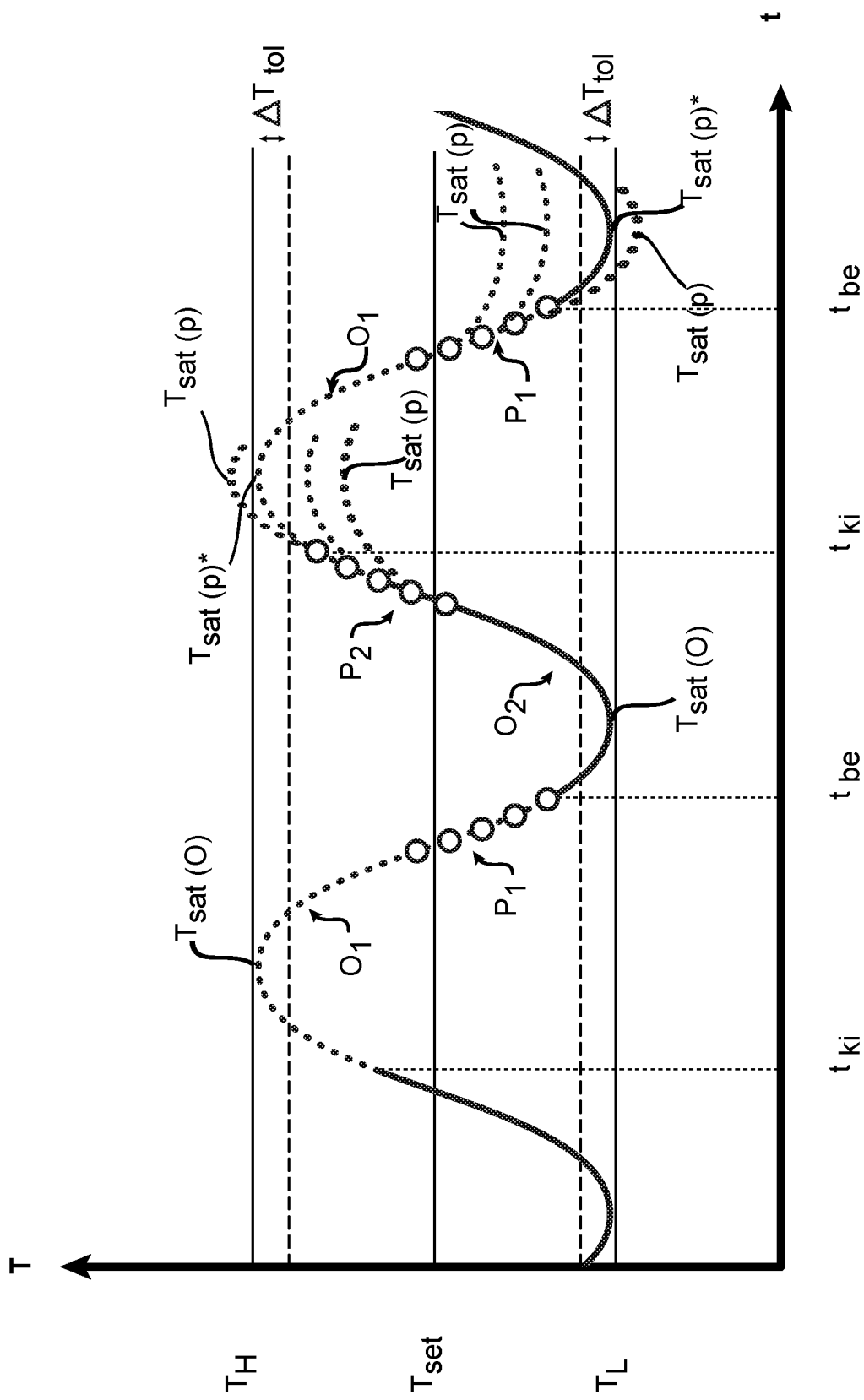
Figure 3B:
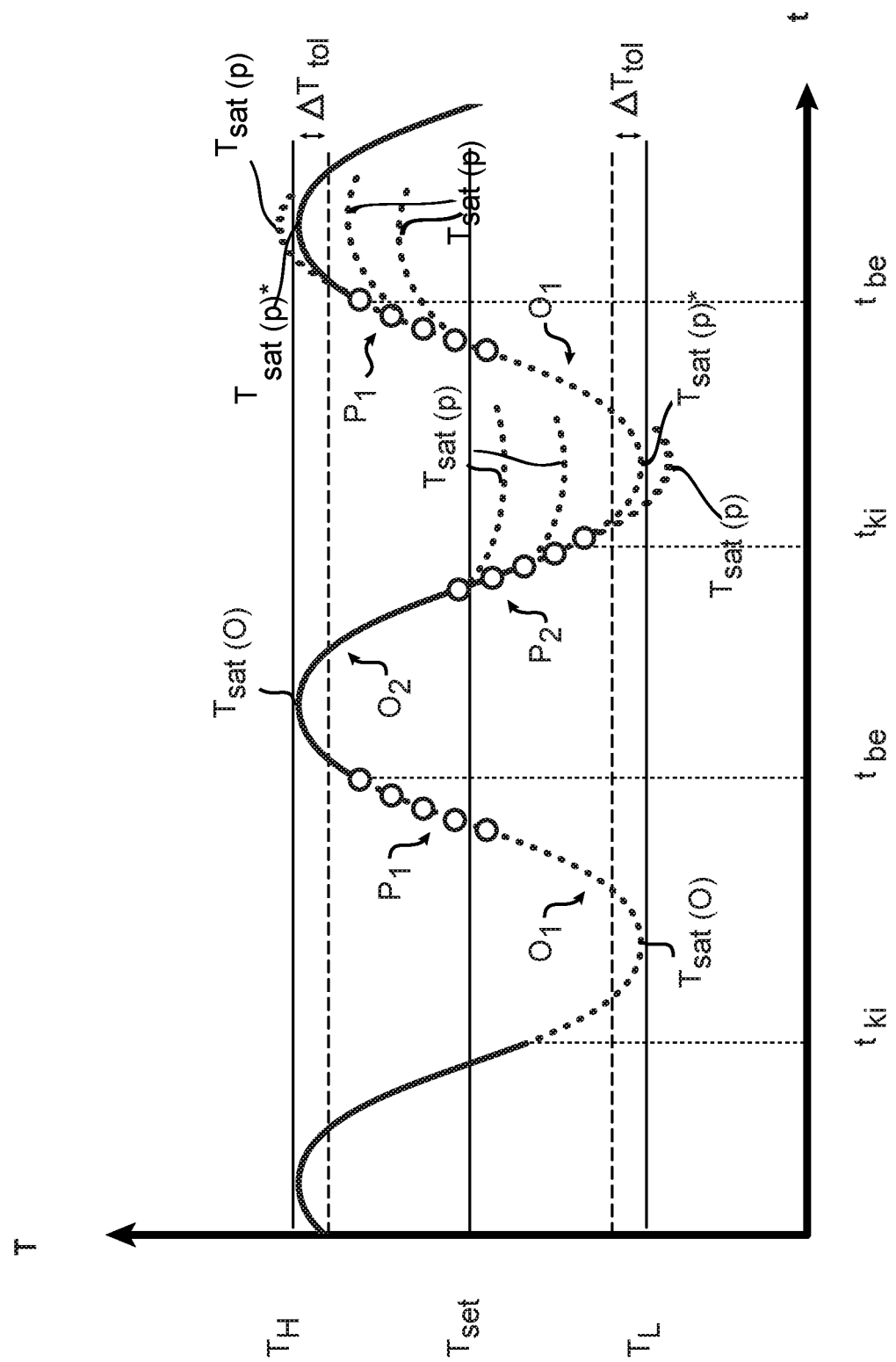

Further details of the invention will be described with reference to the accompanying drawings. In the drawing is FIG. 1 is a temperature curve of a prior art PID control, FIG. 2 is a schematic view of the main components of the system according to the invention, FIG. 3*a* is a graph showing the time dependence of the internal temperature of a room in the case of heating during the implementation of an exemplary embodiment of the method according to the invention;

FIG. 3*b* is a graph showing the time dependence of the internal temperature of a room in the case of cooling during the implementation of an exemplary embodiment of the method according to the invention.

Figure 2:
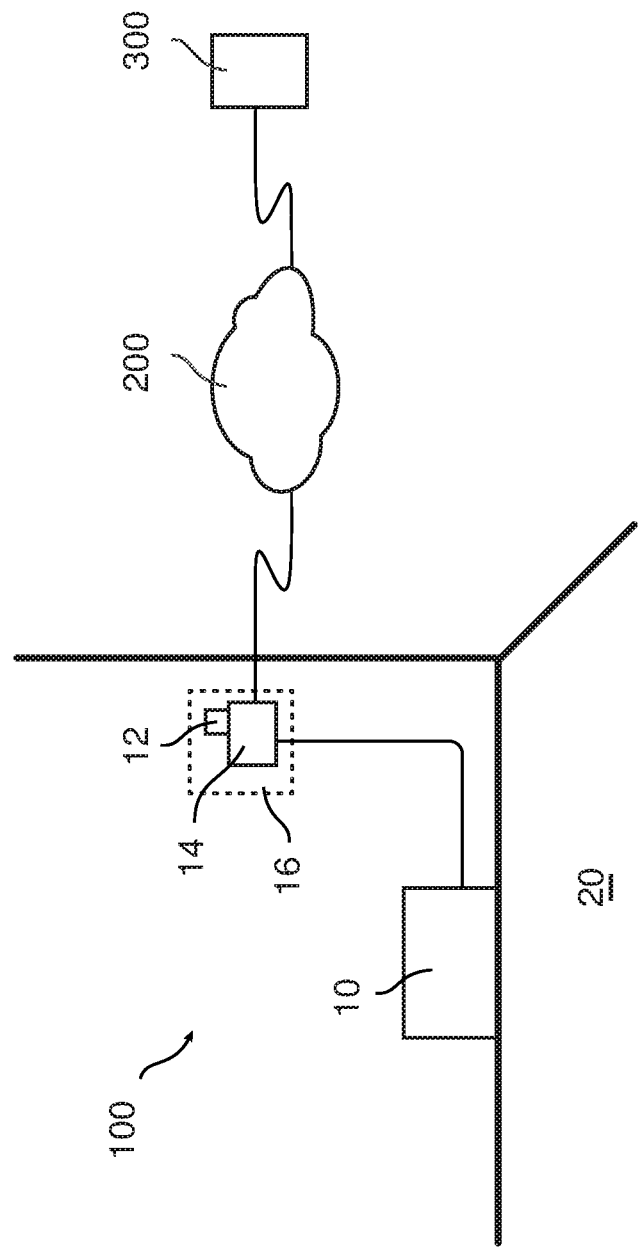

FIG. 2 shows the main components of system 100 according to the invention, which is used to keep the temperature of a room 20 provided with a temperature control means 10 within a temperature range around a pre-set temperature value. The room 20 can be, for example, a room of a residential house, or any space delimited by walls (e.g. a shop, a factory hall, etc.), the temperature control of which is solved by means of a temperature control device 10. In the context of the present invention, the term temperature control device 10 is to be understood broadly to include any heating or cooling device suitable for changing the temperature of the room 20 in the desired direction. The temperature control device 10 may be powered, for example, by electric current or fuel, e.g. gas-fired heaters (convectors), air conditioners (e.g., inverter split air conditioners), etc., as is known to those skilled in the art.

The system 100 further includes a digital temperature sensor 12 for measuring the internal temperature of the room 20 and transmitting the measured temperature data, a control module 14 for turning the temperature control device 10 on or off, and a remote central IT unit 300 in communication with the control module 14 and the temperature sensor 12 via a digital communication channel 200, adapted to implement a neural network.

The sensor 12 according to the invention is adapted to measure the internal temperature of the room 20 at regular intervals and preferably also to record the time of the measurement. For the sake of clarity, in the present description, the temperature of the room 20 means the temperature measured by the sensor 12 arranged in the room 20. The temperature sensor 12 and the control module 14 can optionally be provided as a single unit, preferably a thermostat 16, arranged in the room 20, as is known, for example, in conventional circulating heating systems.

The term central IT unit 300 is broadly understood herein to include any hardware device for receiving, processing, storing, and electronically transmitting processed digital data that can be used to run a neural network. The central IT unit 300 is preferably located outside the room 20, away from it (optionally in another city or country). In a particularly preferred embodiment, the central IT unit 300 is a computer comprises a storage device 300*a* for storing data received from the sensor 12 or the thermostat 16 including the sensor 12, and a central processing unit 300*b* (processor and/or gpu) for processing the received data and implementing a neural network, as will be apparent to those skilled in the art. The IT unit 300 is in communication with the sensor 12 and the control module 14 via the communication channel 200, i.e. the IT unit 300 is able to receive the temperature data measured by the sensor 12 via the communication channel 200. The central IT unit 300 is configured to generate a control signal and transmit it to the control module 14 based on the temperature data received from the temperature sensor 12, and the control module 14 is configured to store and execute the received control signal. That is, through the data transmission connection between the IT unit 300 and the control module 14, the data processed by the IT unit 300 can be transmitted to the control module 14, which will be discussed later.

By neural network in the context of the present invention is meant a parallel, distributed information processing device implemented by means of the IT unit 300, which consists of an interconnected system of operational elements (neurons) performing the same or similar type of local processing and has a learning algorithm and an information retrieval algorithm that allows the use of the learned information, as is known to the person skilled in the art.

In a preferred embodiment, the digital communication channel 200 is implemented within a global information network, preferably the Internet, but other embodiments are possible in which the communication channel 200 is part of a local area network. Note that the concept of a data connection includes both direct and indirect link. The data connection established by the communication channel 200 may be a wired or, optionally, a wireless (e.g., Wi-Fi, Bluetooth, etc.) connection, as is known to those skilled in the art.

The invention further relates to a method for controlling the internal temperature of a room 20 provided with a temperature control device 10, in particular for keeping the temperature of the room 20 within a comfort temperature range determined by a lower and an upper hysteresis temperature $T_L$, $T_H$.

In the first step of the method according to the invention, the internal temperature of the room 20 is set within the comfort temperature range by means of the temperature control device 10, as shown, for example, in FIG. 3*a*. The comfort temperature range is limited at the bottom by the lower hysteresis temperature $T_L$ and at the top by the upper hysteresis temperature $T_H$, which indicate the practical maxima of the permissible deviation from the user-set base temperature $T_{set}$. By base temperature $T_{set}$ is meant the temperature that the user wishes to maintain in the room 20 by means of the temperature control device 10. This can be achieved by heating the room 20 in cold weather (FIG. 3*a*) and by cooling the room 20 in hot weather (FIG. 3*b*). Therefore, as previously mentioned, the temperature control device 10 may be a heating or cooling device, depending on the conditions.

In the next step of the method, the temperature control device 10 is switched off at switch-off time $t_{ki}$, and then the change in the temperature of the room 20 is measured at least until a saturation temperature $T_{sat(O)}$, which can be measured when the direction of temperature change is changed, is reached. In the embodiment of FIG. 3*a*, when the temperature of the room 20 is raised, i.e. heated, by means of the temperature control device 10, the temperature control device 10 is switched off before the temperature of the room 20 reaches the upper hysteresis temperature $T_H$. After switching off the temperature control device 10, the temperature of the room 20 rises even further for a while due to the thermal inertia and then starts to fall. That is, in this embodiment, the maximum temperature that can be measured immediately after the switch-off time $t_{ki}$ will be the measured saturation temperature $T_{sat(O)}$. In contrast, in the embodiment shown in FIG. 3*b* (cooling), the temperature control device 10 is turned off before the room temperature 20 reaches the lower hysteresis temperature $T_L$. After switching off the temperature control device 10, the temperature of the room 20 drops even further for a while due to the thermal inertia and then starts to rise. That is, in this embodiment, the minimum temperature that can be measured immediately after the switch-off time $t_{ki}$ will be the measured saturation temperature $T_{sat(O)}$.

The temperature of the room 20 is measured at specific intervals (e.g. per second), for example by means of the sensor 12 shown above. From the measured temperature data, a first temperature time series O1 is generated, i.e. a time-dependent series of temperature values of the room 20 measured when the temperature control device 10 is switched off. The switch-off of the temperature control device 10, i.e. the determination of the switch-off time $t_{ki}$, can be done manually or by using any temperature control model (including the method according to the present invention).

It is noted that during the operation of neural networks, two phases can typically be distinguished. The first phase, called the learning phase, is used to create the network, during which we incorporate into the network and store the information hidden in the measured temperature data. In the present invention, the neural network is taught based on the first temperature time series O1. Since the learning phase in the case of neural networks assumes long iterations, transients, and possibly unsuccessful learning phases, in the context of the present invention, the first temperature time series O1 may means the totality of temperature data series measured after several switch-off times. As a result of the learning phase, an information processing system is obtained, which is used in the second phase (development phase).

In the next step (development phase) of the method, preferably using the neural network implemented in the central IT unit 300 and the first temperature time series O1, a predicted first temperature time series P1 indicating the future development of the first temperature time series O1 is generated. In the context of the present invention, the use of the first temperature time series O1 means that the neural network is taught by the first temperature time series O1 to model the temperature of the room 20, assuming that the temperature control device 10 is off. The predicted first temperature time series P1 generated by the trained neural network can be used to predetermine how the temperature of the room 20 will change when the temperature control device 10 is off, i.e. the first temperature time series P1 can be considered essentially an extrapolation of the first temperature time series O1.

In the next step of the method, the temperature control device 10 is turned on at switch-on time $t_{be}$ and the temperature change of the room 20 is measured at least until the saturation temperature $T_{sat(O)}$, which can be measured when the direction of temperature change is changed, is reached, and a second temperature time series O2 is generated from the measured temperature data. In the embodiment of FIG. 3a, the temperature control device 10 is switched on before the room temperature 20 reaches the lower hysteresis temperature $T_L$. After switching on the temperature control device 10, the temperature of the room 20 drops even further for a while due to the thermal inertia and then starts to rise. That is, in the case of heating, the minimum saturation temperature that can be measured immediately after the switch-on time $t_{be}$ will be the saturation temperature $T_{sat(O)}$. In contrast, in the embodiment shown in FIG. 3b (cooling), the temperature control device 10 is turned on before the room temperature 20 reaches the upper hysteresis temperature $T_H$. After switching on the temperature control device 10, the temperature of the room 20 rises even further for a while due to the thermal inertia and then begins to fall. That is, in this embodiment, the maximum temperature that can be measured immediately after the switch-on time $t_{be}$ will be the measured saturation temperature $T_{sat(O)}$. By the temperature time series O2 is meant a time-dependent series of temperature values of the room 20 measured when the temperature control device 10 is switched on. The switching on of the temperature control device 10, i.e. the determination of the switching time $t_{be}$, similarly to the switch-off time $t_{ki}$, can be done manually or by using of any temperature control model (including the method according to the invention).

In the next step of the method, using the neural network and using the second temperature time series O2, a predicted second temperature time series P2 is generated to determine the future evolution of the second temperature time series O2. In the context of the present invention, the use of the second temperature time series O2 means that the neural network is taught by the second temperature time series O2 to model the temperature of the room 20, assuming that the temperature control device 10 is on.

Using the predicted second temperature time series P2 generated by the neural network, it can be determined in advance how the temperature of the room 20 will change when the temperature control device 10 is on, i.e. the second temperature time series P2 can be considered an extrapolation of the second temperature time series O2. Note that the second temperature time series O2, like the first temperature time series O1, refers to the totality of the temperature data series measured after several switch-on times $t_{be}$. In a preferred embodiment, a long short-term memory (LSTM) neural network architecture is used to generate the predicted first and second temperature time series O1, O2, as is known to those skilled in the art.

In the next step of the method, predicted saturation temperature values $T_{sat(P)}$ are determined for the elements of the predicted second temperature time series P2, as switch-off times $t_{ki}$, using the neural network and the first temperature time series O1. In other words, using the neural network that was trained with the first temperature time series O1, determining what saturation temperature the room temperature 20 would reach if the temperature control device 10 were turned off at a given element (as a possible switch-off time $t_{ki}$) of the second temperature time series P2. In a preferred embodiment, a long short-term memory (LSTM) or 1-dimensional convolutional neural network architecture is used to determine the predicted saturation temperature values $T_{sat(P)}$, which neural networks are known to those skilled in the art.

From the predicted saturation temperature values of $T_{sat(P)}$ thus determined, the saturation temperature value of $T_{sat(P)*}$ closest to the corresponding hysteresis temperature $T_L$, $T_H$ is selected. In the present case, a suitable hysteresis temperature $T_L$, $T_H$ is understood to mean the upper hysteresis temperature $T_H$ for heating and the lower hysteresis temperature $T_L$ for cooling, as will be apparent to the person skilled in the art (see FIGS. 3a and 3b). From the predicted saturation temperature values $T_{sat(P)}$ determined using the neural network, the saturation temperature $T_{sat(P)*}$ closest to the corresponding hysteresis temperature $T_L$, $T_H$ is selected within the comfort temperature range delimited by the lower and upper hysteresis temperatures $T_L$, $T_H$. In other words, predicted saturation temperature values $T_{sat(P)}$ that are outside the comfort temperature range are not considered. In a possible embodiment, in the vicinity of the lower and upper hysteresis temperatures $T_L$, $T_H$ temperature tolerance ranges $\Delta T_{tol}$ are determined within the comfort temperature range and from the predicted saturation temperature values $T_{sat(P)}$ determined by the neural network, the predicted saturation temperature $T_{sat(P)*}$ closest to the corresponding hysteresis temperature $T_L$, $T_H$ is selected within the appropriate temperature tolerance range $\Delta T_{tol}$. The size of the temperature tolerance ranges $\Delta T_{tol}$ is chosen so that the saturation temperature values $T_{sat(P)*}$ within them can be considered equally good for the given application. The advantage of this embodiment is that it is not necessary to determine the predicted saturation temperature $T_{sat(P)}$ for all elements of the second temperature time series P2, since if one of the predicted saturation temperatures $T_{sat(P)}$ falls within the corresponding temperature tolerance range $\Delta T_{tol}$, it automatically selected as the saturation temperature $T_{sat(P)*}$.

After selecting the saturation temperature value $T_{sat(P)*}$, the switch-off time $t_{ki}$ is determined from the element of the predicted saturation temperature value $T_{sat(P)*}$ of the second temperature time series P2, and then the temperature control device 10 is turned off at the switch-off time $t_{ki}$ thus determined.

After switching off the temperature control device 10, the change in the temperature of the room 20 is measured, and then the first temperature time series O1 and the predicted first temperature time series P1 are generated as described above. Predicted saturation temperature values $T_{sat(P)}$ for the elements of the predicted first temperature time series (P1) are determined, as switch-on times $t_{be}$, using the neural network and the second temperature time series O2. In other words, using the neural network that was trained with the second temperature time series O2, determining what saturation temperature the room temperature 20 would reach if the temperature control device 10 were turned on at a given element (as a possible switch-on time $t_{be}$) of the first temperature time series P1. Then, the saturation temperature value $T_{sat(P)*}$ closest to the corresponding hysteresis temperature $T_L$, $T_H$ is selected from the predicted saturation temperature values $T_{sat(P)}$ as described above, and a switch-on time $t_{be}$ from the element of the predicted first temperature time series P1 corresponding to the selected predicted saturation temperature value $T_{sat(P)*}$ is determined and the temperature control device (10) is switched on at the determined switch-on time $t_{be}$.

It is noted that in the case of the neural network used in the method according to the invention, the learning and development phases are not sharply separated in time, i.e. the neural network continuously learns over time by comparing the predicted temperature time series and the predicted saturation temperatures with the actually measurable temperature values. This is necessary because the environmental parameters of the room 20 (e.g. outdoor temperature, solar radiation) and the user habits are constantly changing, so the information processing method must also change. However, the neural network used in the present invention is also characterized in that a longer, purely learning phase precedes the parallel learning-development phase, during which the switch-on times $t_{be}$ and switch-off times $t_{ki}$ are entered, for example, manually or by means of another known temperature control model (e.g. PID).

Various modifications to the above disclosed embodiments will be apparent to a person skilled in the art without departing from the scope of protection determined by the attached claims.

The invention claimed is:

1. Method for controlling the temperature of a room (20) provided with a temperature control device (10), in particular for keeping the temperature of the room (20) within a comfort temperature range defined by a lower and an upper hysteresis temperature ($T_L$, $T_H$), characterized in that
setting the temperature of the room (20) within the comfort temperature range by means of the temperature control device (10), then
switching off the temperature control device (10) at the switch-off time ($t_{ki}$) and measuring the change in the temperature of the room (20) at least until the measured saturation temperature ($T_{sat(O)}$), can be measured when changing the direction of the temperature change, is reached, and a first temperature time series (O1) is generated from the measured temperature data, then using a neural network and using the first temperature time series (O1), creating a predicted first temperature time series (P1) indicating the future change of the first temperature time series (O1),
switching on the temperature control device (10) at the switch-on time ($t_{be}$) and measuring the change in temperature of the room (20), at least until the measured saturation temperature ($T_{sat(O)}$), can be measured when changing the direction of the temperature change, is reached, and a second temperature time series (O2) is generated from the measured temperature data, then using a neural network and using the second temperature time series (O2), creating a predicted second temperature time series (P2) indicating the future change of the second temperature time series (O2),
determining predicted saturation temperature values ($T_{sat(P)}$) for the elements of the predicted second temperature time series (P2), as switch-off times ($t_{ki}$), using the neural network and the first temperature time series (O1) and selecting from the determined predicted saturation temperature values ($T_{sat(P)}$) the closest to the corresponding hysteresis temperature ($T_H$, $T_L$),
determining a switch-off time ($t_{ki}$) from the element of the predicted second temperature time series (P2) corresponding to the selected predicted saturation temperature value ($T_{sat(P)}*$) and then switching off the temperature control device (10) at the determined switch-off time ($t_{ki}$),
determining predicted saturation temperature values ($T_{sat(P)}$) for the elements of the predicted first temperature time series (P1), as switch-on times ($t_{be}$), using the neural network and the second temperature time series (O2) and selecting from the determined predicted saturation temperature values ($T_{sat(P)}$) the closest to the corresponding hysteresis temperature (TH, TL),
determining a switch-on time ($t_{be}$) from the element of the predicted first temperature time series (P1) corresponding to the selected predicted saturation temperature value ($T_{sat(P)}*$) and then switching on the temperature control device (10) at the determined switch-on time ($t_{be}$).

2. Method according to claim 1, characterized in that determining temperature tolerance ranges ($\Delta T_{tol}$) in the vicinity of the lower and upper hysteresis temperatures ($T_L$, $T_H$) and from the predicted saturation temperature values ($T_{sat(P)}$) determined by the neural network, the predicted saturation temperature ($T_{sat(P)}*$) closest to the corresponding hysteresis temperature ($T_L$, $T_H$) is selected within the appropriate temperature tolerance range ($\Delta T_{tol}$).

3. Method according to claim 1, characterized in that a long short-term memory (LSTM) or a 1-dimensional convolutional neural network architecture is used to determine the predicted saturation temperature values ($T_{sat(P)}$).

4. Method according to claim 1, characterized in that a long short-term memory (LSTM) neural network architecture is used to generate the predicted first and second temperature time series (P1, P2).

5. A system (100) for carrying out the method according to claim 1 and comprising a temperature sensor (12) for measuring the internal temperature of the room (20) and transmitting the measured temperature data, a control module (14) for switching on and off the temperature control device (10), and a remote central IT unit (300) in communication with the control module (14) and the temperature sensor (12) via a digital communication channel (200), adapted to implement a neural network, which central IT unit (300) is configured to generate a control signal and transmit it to the control module (14) based on the temperature data received from the temperature sensor (12), and the control module (14) is configured to store and execute the received control signal.

6. System (100) according to claim 5, characterized in that the digital communication channel (200) is implemented within a global information network.

7. System (100) according to claim 5, characterized in that the temperature sensor (12) and the control module (14) are provided as a single unit.

8. The system (100) according to claim 7 wherein the single unit is a thermostat (16).

9. System (100) according to claim 6 wherein the global information network is Internet.

* * * * *